(12) United States Patent
Nakazawa (10) Patent No.: US 11,384,678 B2
(45) Date of Patent: Jul. 12, 2022

(54) HEAT INSULATING COVER FOR EXHAUST DEVICE

(71) Applicant: SANGO CO., LTD., Miyoshi (JP)

(72) Inventor: Kenji Nakazawa, Miyoshi (JP)

(73) Assignee: SANGO CO., LTD., Miyoshi (JP)

( * ) Notice: Subject to any disclaimer, the term of this patent is extended or adjusted under 35 U.S.C. 154(b) by 658 days.

(21) Appl. No.: 16/332,808

(22) PCT Filed: Oct. 9, 2018

(86) PCT No.: PCT/JP2018/037588
§ 371 (c)(1),
(2) Date: Mar. 13, 2019

(87) PCT Pub. No.: WO2019/082639
PCT Pub. Date: May 2, 2019

(65) Prior Publication Data
US 2021/0355855 A1    Nov. 18, 2021

(30) Foreign Application Priority Data
Oct. 24, 2017    (JP) .............................. JP2017-205286

(51) Int. Cl.
*F01N 3/28*          (2006.01)
*F01N 13/14*         (2010.01)
(Continued)

(52) U.S. Cl.
CPC .......... *F01N 13/14* (2013.01); *F01N 13/1894* (2013.01); *F16L 59/14* (2013.01); *F01N 3/28* (2013.01); *F01N 2510/02* (2013.01)

(58) Field of Classification Search
CPC .. F01N 13/14; F01N 13/1894; F01N 2510/02; F16L 59/14
(Continued)

(56) References Cited

U.S. PATENT DOCUMENTS 5,273,724 A * 12/1993 Bos ..................... F01N 3/2857
422/179

FOREIGN PATENT DOCUMENTS

JP    H07197812 A    8/1995
JP    H09201514 A    8/1997
(Continued)

OTHER PUBLICATIONS

International Search Report (in Japanese) for PCT/JP2018/037588, dated Nov. 16, 2018; ISA/JP.
(Continued)

*Primary Examiner* — Tom P Duong
(74) *Attorney, Agent, or Firm* — Harness, Dickey & Pierce, P.L.C.

(57) ABSTRACT

There is provided a heat insulating cover for an exhaust device, including outer shell members each having flanges formed at both ends in a peripheral direction, and the adjacent flanges are bonded to each other without generating any gap in an entire axial direction of the heat insulating cover for the exhaust device. A flange includes at least two fixing portions provided apart from each other in the axial direction of an exhausting member, the fixing portions of the adjacent flanges in the peripheral direction abutting each other and being fixed in a face-to-face manner, and includes an inclined portion provided between the fixing portions in the axial direction, the inclined portion being inclined relative to the fixing portions to be positioned closer to the other adjacent flange as being closer to an outer side in the peripheral direction.

1 Claim, 6 Drawing Sheets (51) Int. Cl.
　　　*F01N 13/18*　　　(2010.01)
　　　*F16L 59/14*　　　(2006.01)
(58) Field of Classification Search
　　　USPC .......................................... 422/180; 138/159
　　　See application file for complete search history.

(56) References Cited

FOREIGN PATENT DOCUMENTS

| | | |
|---|---|---|
| JP | H11076837 A | 3/1999 |
| JP | 2002106336 A | 4/2002 |

OTHER PUBLICATIONS

Office Action dated Nov. 17, 2020 in corresponding Japanese Patent Application No. 2019-550953.

* cited by examiner

HEAT INSULATING COVER FOR EXHAUST DEVICE

CROSS REFERENCE TO RELATED APPLICATIONS

This application is a U.S. National Phase Application under 35 U.S.C. 371 of International Application No. PCT/JP2018/037588 filed on Oct. 9, 2018. This application is based on and claims the benefit of priority from Japanese Patent Application No. 2017-205286 filed on Oct. 24, 2017. The entire disclosures of all of the above applications are incorporated herein by reference.

TECHNICAL FIELD

The present invention relates to a heat insulating cover for an exhaust device.

BACKGROUND ART

Heretofore, for purposes of improving heat retaining properties of exhausting components such as an exhaust pipe of an internal combustion engine or the like and a catalyst converter and inhibiting thermal damages to peripheral components arranged in a periphery of the exhausting component due to radiation therefrom, exhaust devices have been produced in such a manner that an insulating material such as glass wool is disposed on an outer periphery of the exhausting component and a heat insulating cover is mounted on an outer portion of the insulating material.

Figure 10:
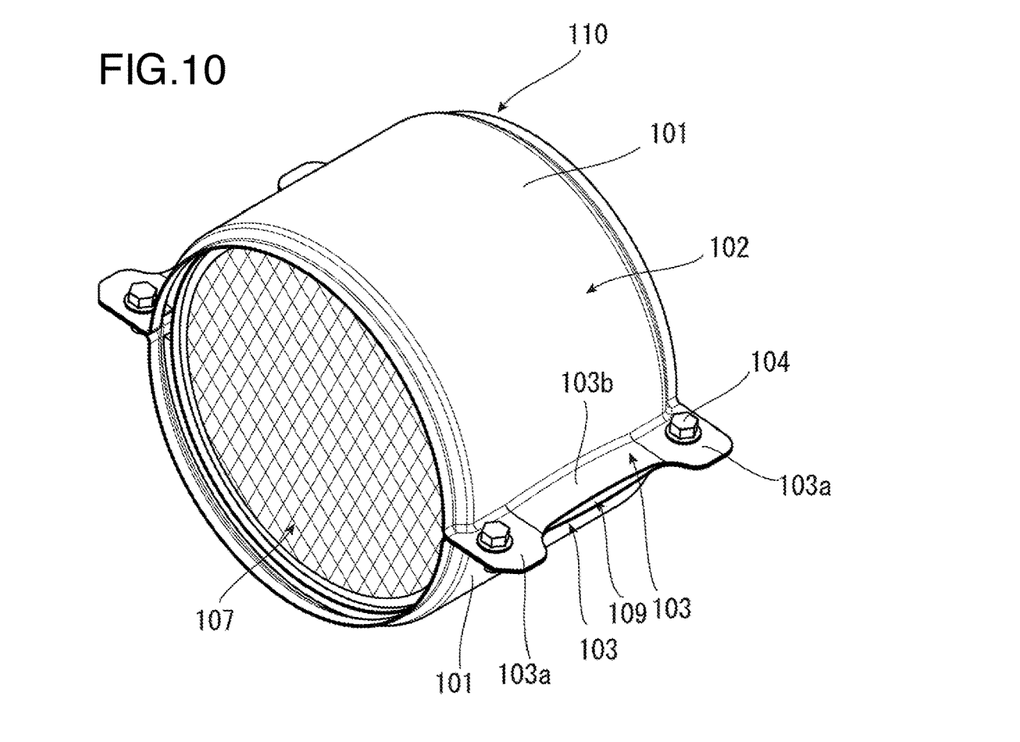
FIG. 10 is a perspective view of an exhaust device of a related art.
Figure 11:
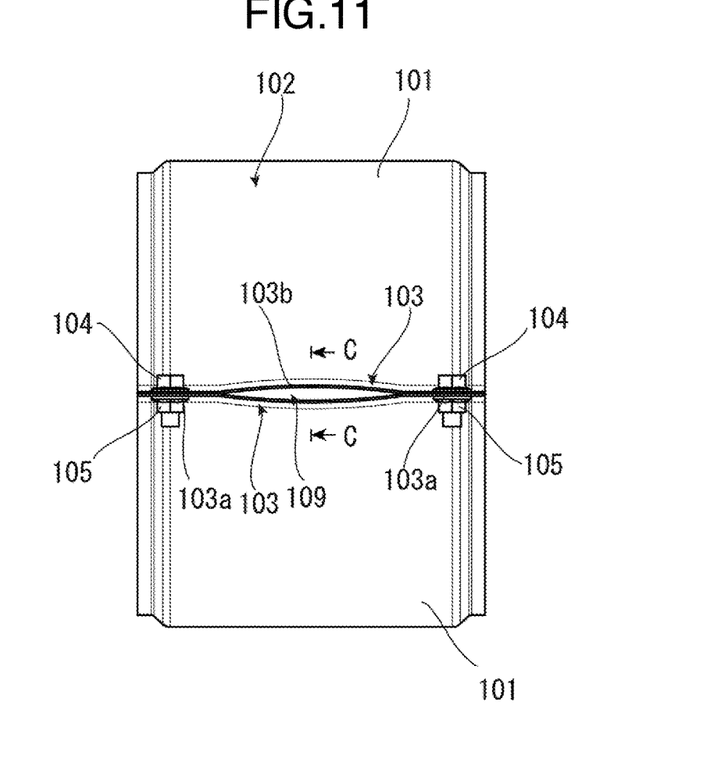
FIG. 11 is a side view of FIG. 10.
Figure 12:
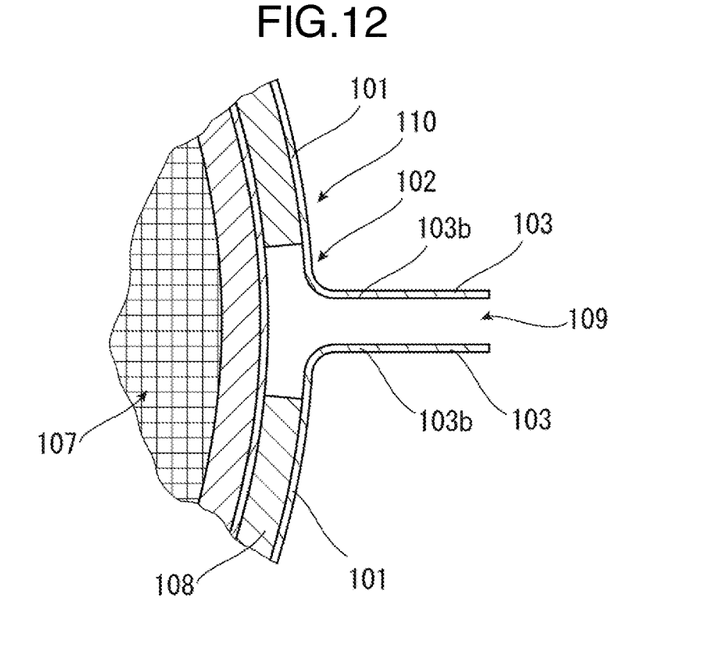
FIG. 12 is a cross-sectional view taken along C-C line of FIG. 11.

As one of such exhaust devices, there is known an exhaust device 110 including a heat insulating cover 102 composed of a pair of half cylindrical shells 101, 101 as shown in FIG. 10 to FIG. 12. In both end portions of each shell 101 in a peripheral direction, flanges 103 having bolt holes are formed. The adjacent flanges 103, 103 are vertically aligned, and then bolts 104 are inserted into the bolt holes and screwed into nuts 105, thereby coupling both the shells 101, 101 to each other. The heat insulating cover 102 is mounted via an insulating material 108 on an outer periphery of a catalyst converter 107 that is an exhausting component (see Patent Literature 1).

CITATION LIST

Patent Literature

PATENT LITERATURE 1: JP-A-07-197812

SUMMARY OF INVENTION

Technical Problem

According to the above conventional exhaust device 110, as shown in FIG. 10 to FIG. 12, in fixing regions 103*a* of flanges 103 fixed by bolts 104, the flanges 103, 103 are brought into contact closely with each other by fastening the bolts 104. However, in a central portion 103*b* or the like of the flange 103 between the bolts 104 and 104, as shown in FIG. 11 and FIG. 12, there is risk that the flanges 103, 103 do not come in contact closely with each other and a gap 109 is generated due to repulsion of an insulating material 108 disposed in a compressed manner inside a heat insulating cover 102.

It is concerned that, when the gap 109 is generated, radiation occurs from the gap 109 and deterioration of a heat retaining performance of a catalyst converter 107 and thermal damages to peripheral components are caused.

Furthermore, when a shell 101 is made of a metal and prepared by stamping, there is risk that burrs generated by stamping may remain at ends of each flange 103 and the burrs exposed from the gap 109 interfere with a mounting operation.

Accordingly, an object of the present invention is to propose a heat insulating cover for an exhaust device which solves the above problems.

Solution to Problem

To solve the above problems, according to the present invention, there is provided a heat insulating cover mounted via an insulating material on an outer periphery of an exhausting component having an axial center, including:
one or more outer shell members provided in a peripheral direction and including flanges formed in both end portions of the outer shell member in the peripheral direction,
wherein each of the flanges includes at least two fixing portions provided apart from each other in an axial direction of the exhausting component, the fixing portions of the adjacent flanges in the peripheral direction abutting each other and being fixed in a face-to-face manner, and
an inclined portion provided between the fixing portions in the axial direction, the inclined portion being inclined relative to the fixing portions to be positioned closer to the other adjacent flange as being closer to an outer side in the peripheral direction.

Advantageous Effects of Invention

According to the present invention, at least two fixing portions abutting each other and fixed in a face-to-face manner are provided apart from each other in an axial direction, and an inclined portion is provided between the fixing portions, which is inclined relative to the fixing portions to be positioned closer to the other adjacent flange as being closer to an outer side in a peripheral direction. Consequently, when a heat insulating cover is mounted via an insulating material on an exhausting component, it is possible to prevent any gap from being generated between the adjacent flanges, it is possible to inhibit thermal damages to peripheral components due to radiation from the exhausting component, and it is possible to inhibit exposure of burrs that may interfere with a mounting operation.

DESCRIPTION OF EMBODIMENTS

A mode for carrying out the present invention will be described on the basis of embodiments shown in the drawings.

Embodiment 1

Figure 1:
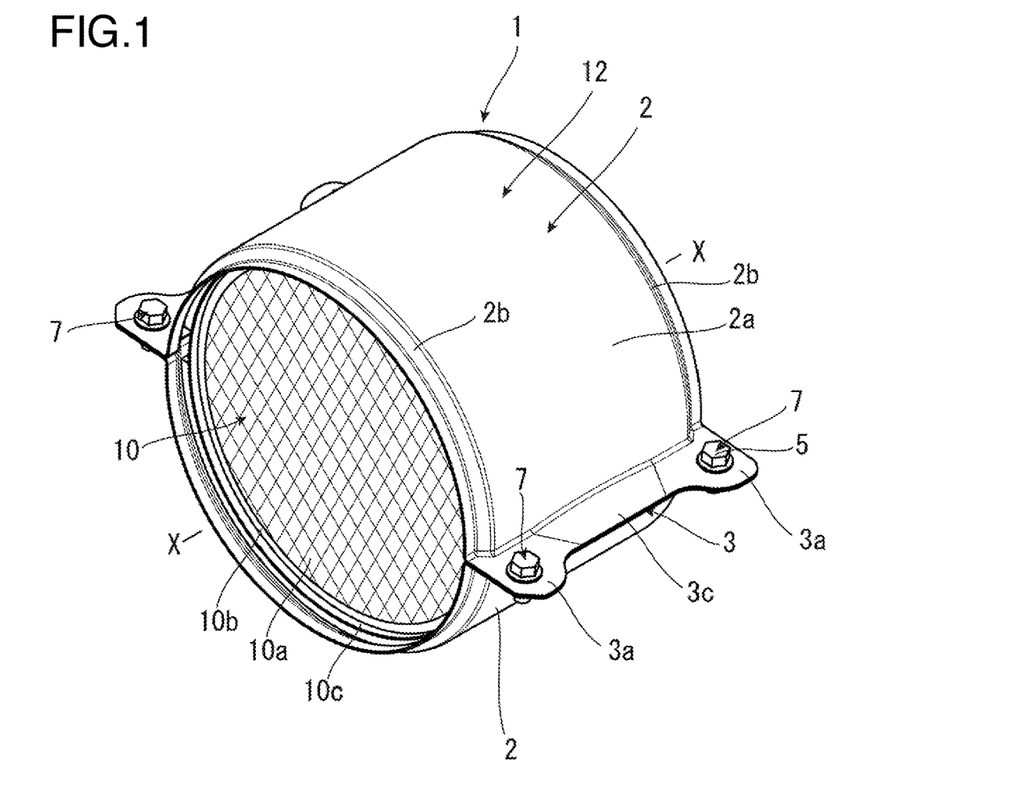
FIG. 1 is a perspective view of an exhaust device according to Embodiment 1 of the present invention.

FIG. 1 shows a perspective view of an exhaust device 1 according to Embodiment 1 of the present invention.

Figure 5:
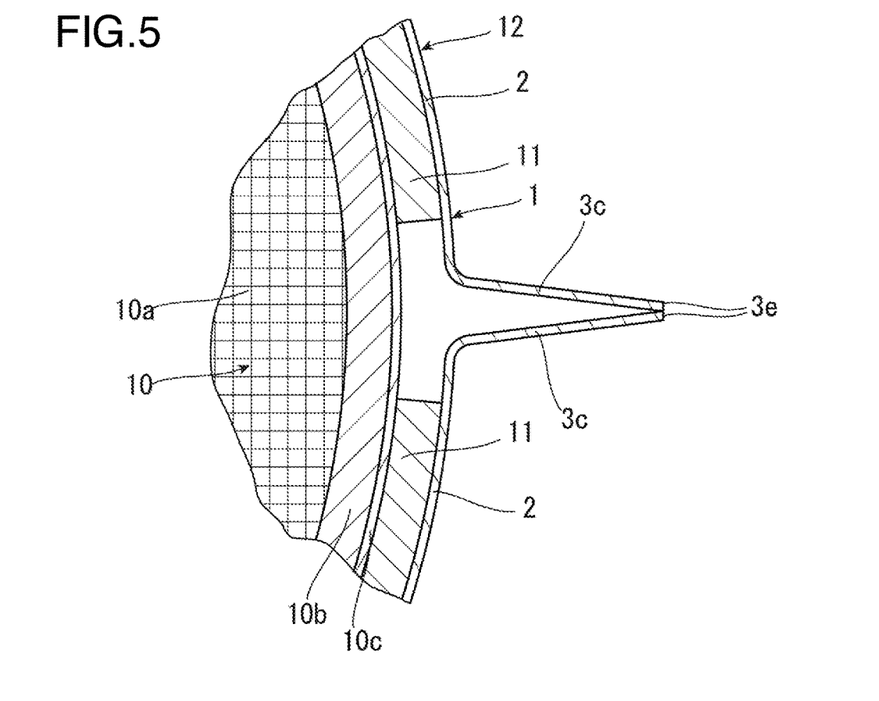
FIG. 5 is a cross-sectional view taken along A-A line of FIG. 4.
Figure 6:
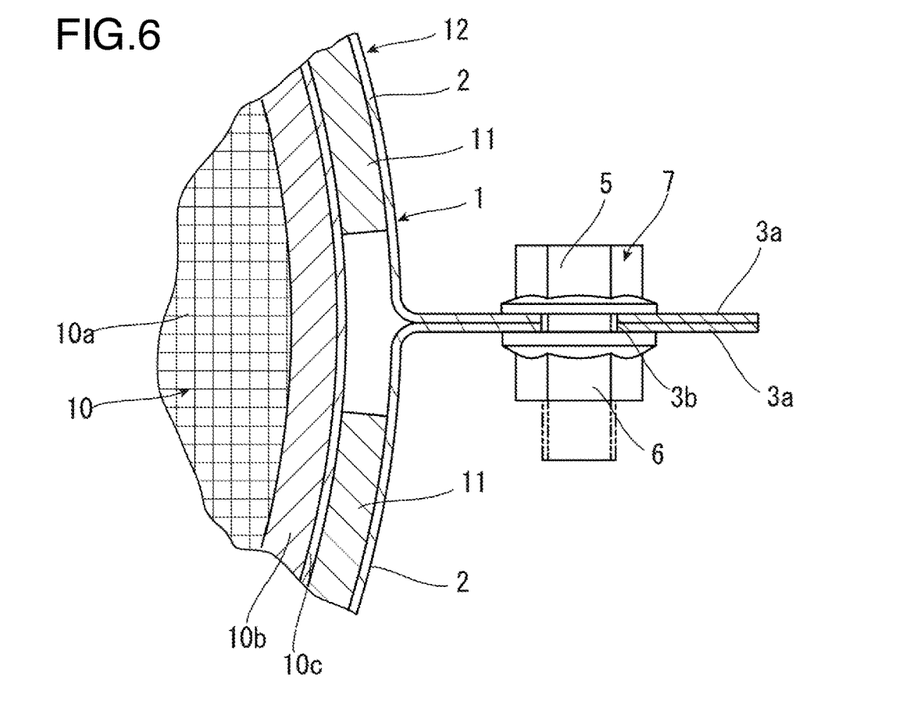
FIG. 6 is a partial cross-sectional view taken along B-B line of FIG. 4.

In the exhaust device 1, as shown in FIG. 1, FIG. 5 and FIG. 6, a heat insulating cover for the exhaust device (hereinafter referred to simply as the heat insulating cover) 12 is mounted via an insulating material 11 on an outer peripheral portion of an exhausting component such as an exhaust pipe of an internal combustion engine or the like, a catalyst converter, a diesel particulate filter (DPF) or a gasoline particulate filter (GPF). In the present embodiment 1, a catalyst converter 10 is used as the exhausting component. The catalyst converter 10 includes a columnar catalyst carrier 10a provided in a central portion, a buffer material 10b provided in an outer peripheral portion of the catalyst carrier 10a, and a case 10c provided in an outer peripheral portion of the buffer material 10b.

As shown in FIG. 1, the heat insulating cover 12 is formed into a cylindrical shape by bonding a pair of outer shell members 2, 2. Each of the outer shell members 2, 2 has a half-cylindrical main body portion 2a formed by curving a metal plate so that its vertical cross section has a semicircular shape around an axial center X-X of the heat insulating cover 12, and flanges 3, 3 are formed integrally with the main body portion 2a by outwardly bending both end portions of the main body portion 2a in a peripheral direction around the axial center X-X of the heat insulating cover 12. Furthermore, in both the end portions of the main body portion 2a in an axial center X-X direction, reduced diameter portions 2b, 2b reducing their diameters toward the outside are formed.

In the flange 3, as shown in FIG. 1 to FIG. 4, two fixing portions 3a, 3a extending outwardly from a radial direction around the axial center X-X are formed apart from each other in both end portions in the axial center X-X direction. The fixing portions 3a, 3a of the adjacent flanges 3, 3 in the peripheral direction are fastened to each other by fastening means, such as bolt and nut, and spot welding. In the present embodiment, a bolt insertion hole 3b is formed in each fixing portion 3a, and a bolt 5 is inserted into the insertion holes 3b, 3b of the adjacent flanges 3, 3 and is then screwed into a nut 6 to fasten the fixing portions 3a, 3a to each other, so that the insertion holes 3b, the bolts 5 and the nuts 6 constitute fastening means 7.

Thus, the fixing portions 3a, 3a are fastened to each other by the fastening means, and hence the fixing portions 3a, 3a forcibly abut each other on their substantially entire surfaces and are fixed in a face-to-face manner as shown in FIG. 6, even if the fixing portions are repelled due to repulsion of the insulating material 11 interposed between the main body portion 2a and the catalyst converter 10.

Figure 2:
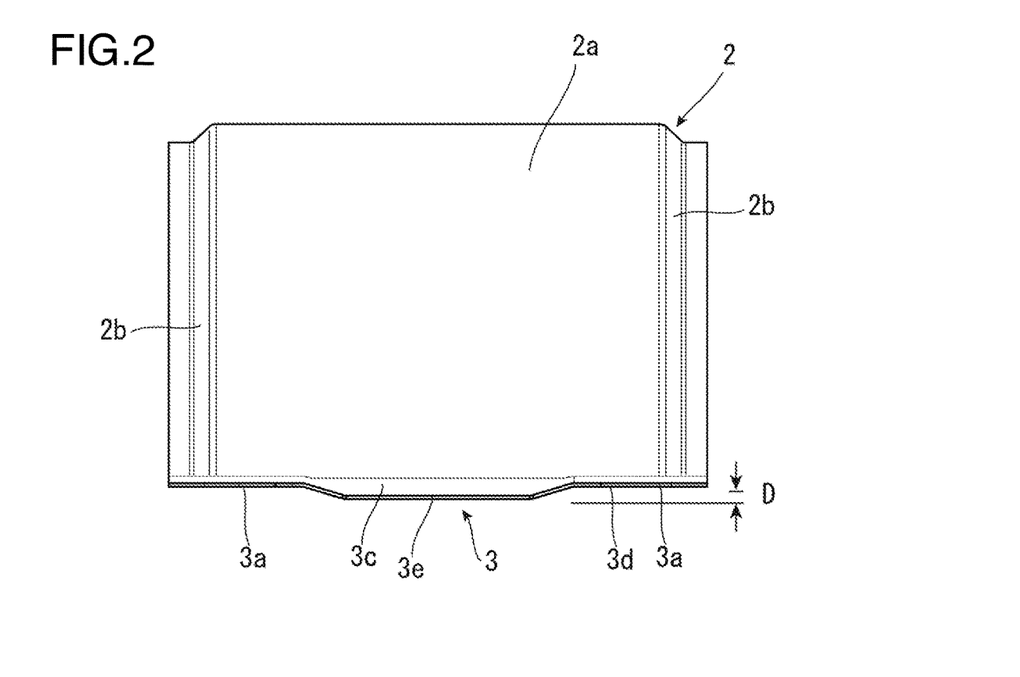
FIG. 2 is a side view of an outer shell member for use in Embodiment 1 of the present invention.
Figure 3:
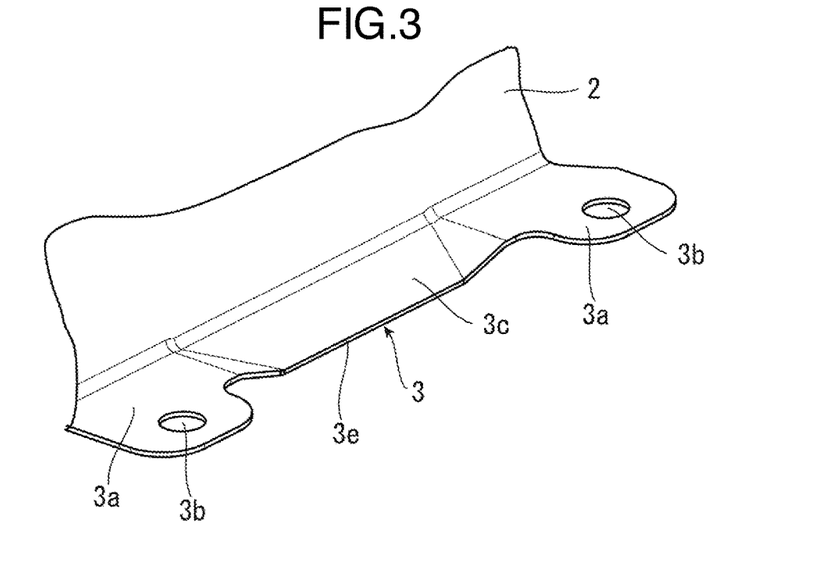
FIG. 3 is an enlarged perspective view of a main part of a flange portion of FIG. 2.
Figure 4:
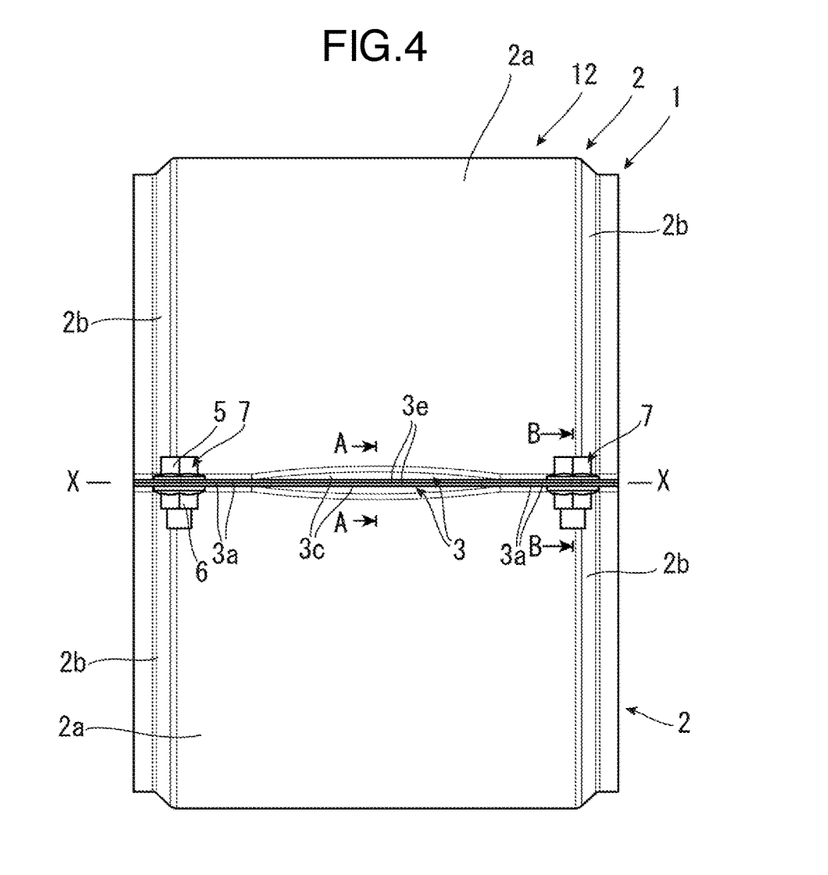
FIG. 4 is a side view of FIG. 1.

As shown in FIG. 5, one inclined portion 3c is formed between the fixing portions 3a and 3a of each flange 3, and the fixing portions 3a and the inclined portion 3c are continuously and integrally formed by stamping. As shown in FIG. 2 and FIG. 4, the inclined portion 3c is inclined relative to the fixing portion 3a to be positioned closer to an adjacent flange 3 as being closer to an outer side (a tip side) in the peripheral direction. Additionally, in a state where the flanges 3, 3 are not fastened to each other, as shown in FIG. 2, a tip 3e of the inclined portion 3c of the flange 3 is formed to be positioned closer to the other adjacent flange 3 than to an abutment surface 3d of the fixing portion 3a. In the present embodiment, the tip 3e of the inclined portion 3c is positioned about 0.1 mm to 3 mm closer to the adjacent flange 3 than to the abutment surface 3d of the fixing portion 3a.

Note that in FIG. 2, a protruding amount D of the inclined portion 3c is drawn in an exaggerated manner.

In the state where the outer shell members 2, 2 are not fastened to each other, the tip 3e of the inclined portion 3c of the flange 3 is formed to be positioned closer to the adjacent flange 3 than to the abutment surface 3d of the fixing portion 3a. Consequently, also in a state where the heat insulating cover 12 is assembled via the insulating material 11 to the catalyst converter 10 to constitute the exhaust device 1, as shown in FIG. 4 and FIG. 5, the tips 3e, 3e of the inclined portions 3c of the adjacent flanges 3, 3 abut each other, and any gap that has been generated in a related art is not generated in the whole axis X-X direction of the flange 3. Furthermore, also when the outer shell members 2, 2 are assembled to each other in a state where the positions of the tips of the inclined portions 3c are displaced from each other, any gap can be prevented from being generated.

According to the present invention, as described above, in the state where the outer shell members 2, 2 are not fastened to each other, the flange 3 on one side includes the two fixing portions 3a, 3a provided apart from each other in the axial center X-X direction, and the inclined portion 3c provided between the fixing portions 3a and 3a, and the inclined portion 3c is inclined relative to the fixing portions 3a to be positioned closer to the other adjacent flange 3 as being closer to the tip, thereby constituting the outer shell member 2. Consequently, when the outer shell members 2, 2 are assembled via the insulating material 11 to the catalyst converter 10 to constitute the exhaust device 1 as shown in FIG. 5 and FIG. 6, it is possible to hold and fix the outer shell members 2, 2 without generating any gap between the flanges 3 and 3 adjacent to each other, over the whole axial center X-X direction.

Thus, any gap is prevented from being generated, and in consequence, it is possible to inhibit thermal damages to peripheral components due to radiation from the catalyst converter 10, and it is also possible to inhibit exposure of burrs that may interfere with a mounting operation of the heat insulating cover 12.

Figure 7:
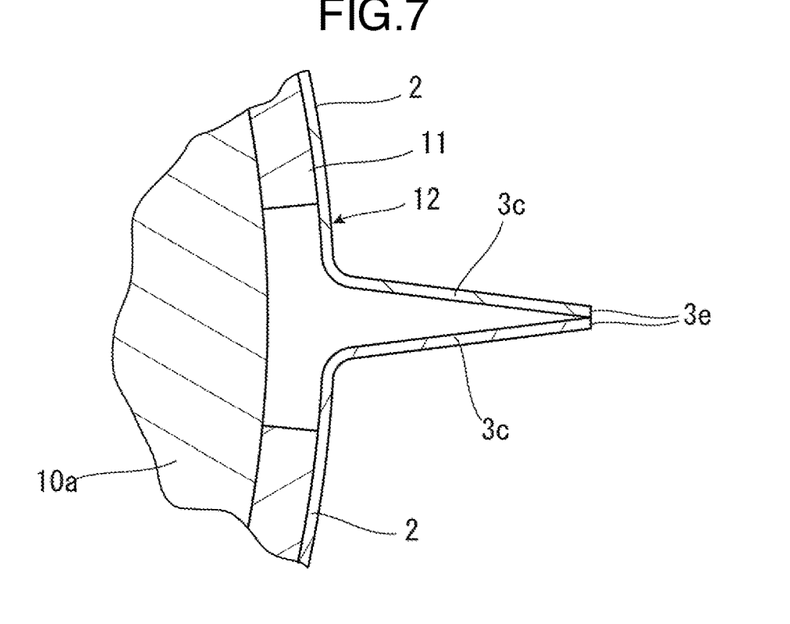
FIG. 7 is a view showing another example of Embodiment 1 of the present invention, and corresponding to the cross-sectional view taken along the A-A line.
Figure 8:
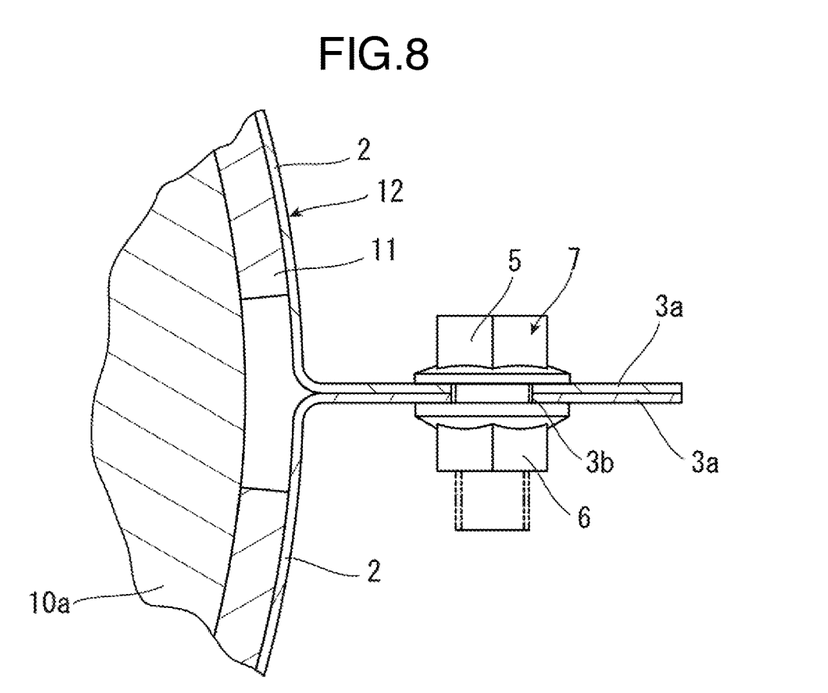
FIG. 8 is a view showing still another example of Embodiment 1 of the present invention, and corresponding to the cross-sectional view taken along the B-B line.

Note that in the above embodiment 1, the heat insulating cover 12 is mounted via the insulating material 11 on the outer peripheral portion of the catalyst converter 10. However, as shown in FIG. 7 and FIG. 8, the heat insulating cover 12 may be mounted via the insulating material 11 on the outer peripheral portion of the catalyst carrier 10a that is the exhausting component.

Embodiment 2

In the above embodiment 1, the heat insulating cover 12 includes a pair of outer shell members 2, 2, but the number of the constituting outer shell members can appropriately be set to one or more. Furthermore, a dividing position of the outer shell member in the heat insulating cover can also appropriately be set. In the above embodiment 1, the heat insulating cover 12 is composed using the outer shell members 2, 2 having the same shape. However, outer shell members having different shapes may be combined and composed in accordance with an outer peripheral shape of the catalyst converter 10, or a shape or position of the insulating material 11.

Figure 9:
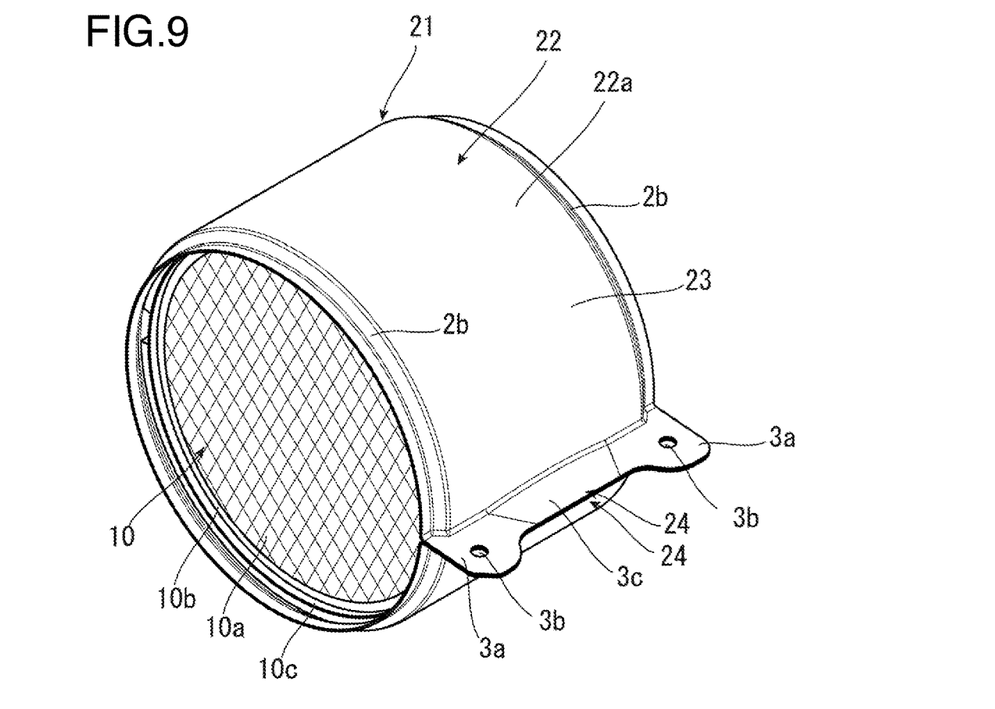
FIG. 9 is a perspective view of an exhaust device according to Embodiment 2 of the present invention.

For example, as shown in FIG. 9, an exhaust device 21 may be composed using a heat insulating cover 22 including one outer shell member 22*a*. The outer shell member 22*a* has one annular main body portion 23, and flanges 24, 24 are formed in both end portions of the main body portion 23 in a peripheral direction. Both the flanges 24, 24 are formed similarly to the flange 3 of the above embodiment 1.

The other structure is similar to that of the above embodiment 1, and is therefore denoted with reference signs similar to the above signs, and description thereof is omitted.

Also in the present embodiment 2, effects similar to those of the above embodiment 1 are produced.

According to the present embodiment 2, further in the exhaust device 21 composed of the heat insulating cover 22 including one outer shell member 22*a*, as compared with the above embodiment 1, the number of components can be decreased, the number of fastening means can also be decreased, and manufacturing cost can be decreased.

Embodiment 3

According to the above embodiments 1 and 2, in each of the flanges 3 and 24, two fixing portions 3*a*, 3*a* are formed apart from each other in the axial center X-X direction. However, the number of the fixing portions 3*a* to be provided in one flange 3 or 24 can appropriately be set as long as the number is two or more. Between the fixing portions 3*a* adjacent to each other in the axial center X-X direction, the inclined portion 3*c* is provided in the same manner as in the above embodiments 1 and 2. Note that it is preferable to provide the fixing portions 3*a* in at least both end portions of the flange 3 or 24 in the axial center X-X direction.

The other structure is similar to those of the above embodiments 1 and 2, and hence description thereof is omitted.

Also in the present embodiment 3, effects similar to those of the above embodiments 1 and 2 are produced.

What is claimed is:

1. A heat insulating cover for an exhaust device, the heat insulating cover being mounted via an insulating material on an outer periphery of an exhausting component having an axial center, the heat insulating cover comprising:
    one or more outer shell members provided in a peripheral direction and including flanges formed in both end portions of the outer shell member in the peripheral direction,
    wherein each of the flanges includes at least two fixing portions provided apart from each other in an axial direction of the exhausting component, the fixing portions of the adjacent flanges in the peripheral direction abut and are fixed to each other in a face-to-face manner, are fastened to each other by a fastening means, and contact each other substantially over an entire surface, ends of the adjacent flanges abut each other between the fixing portions, and
    an inclined portion provided between the fixing portions in the axial direction, the inclined portion being inclined relative to the fixing portions to be positioned closer to the other adjacent flange as being closer to an outer side in the peripheral direction.

* * * * *